United States Patent
Libell et al.

(10) Patent No.: US 12,361,447 B2
(45) Date of Patent: Jul. 15, 2025

(54) SYSTEMS AND METHODS FOR DETECTING AND MITIGATING CLICK FARM FRAUD

(71) Applicant: LEXISNEXIS RISK SOLUTIONS FL INC., Boca Raton, FL (US)

(72) Inventors: Tony Libell, Luleå (SE); Per Burström, Luleå (SE); Philip Lindblad, Lidingö (SE); Lancelot Pregniard, London (GB)

(73) Assignee: LEXISNEXIS RISK SOLUTIONS FL INC., Boca Raton, FL (US)

( * ) Notice: Subject to any disclaimer, the term of this patent is extended or adjusted under 35 U.S.C. 154(b) by 69 days.

(21) Appl. No.: 18/462,483

(22) Filed: Sep. 7, 2023

(65) Prior Publication Data
US 2025/0086675 A1   Mar. 13, 2025

(51) Int. Cl.
G06Q 30/0241 (2023.01)
H04W 12/73 (2021.01)
H04W 12/79 (2021.01)

(52) U.S. Cl.
CPC ........ *G06Q 30/0248* (2013.01); *H04W 12/73* (2021.01); *H04W 12/79* (2021.01)

(58) Field of Classification Search
CPC ... G06Q 30/0248; H04W 12/73; H04W 12/79
See application file for complete search history.

(56) References Cited

U.S. PATENT DOCUMENTS 8,433,785 B2 *  4/2013  Awadallah .......... G06F 11/3485
                                                        709/224
11,373,205 B2 *  6/2022  Li ...................... G06Q 30/0225
(Continued)

OTHER PUBLICATIONS

Neng. Li, S. Du, H. Zheng, M. Xue and H. Zhu, "Fake reviews tell no tales? dissecting click farming in content-generated social networks," in China Communications, vol. 15, No. 4, pp. 98-109, Apr. 2018, accessed at < https://ieeexplore.ieee.org/document/8357744?source=IQplus> (Year: 2018).*
(Continued)

*Primary Examiner* — Ilana L Spar
*Assistant Examiner* — Melinda Gieringer
(74) *Attorney, Agent, or Firm* — TROUTMAN PEPPER LOCKE LLP; James E. Schutz; Mark Lehi Jones

(57) ABSTRACT

System and methods are provided for mitigating click farm fraud by receiving network data and sensor data from a plurality of computing devices, extracting one or more features from the sensor data and the network data for each of the devices. The features represent one or more of a local physical environment and communication channel environment associated with a device of the plurality of computing devices. The method includes determining one or more subsets of the plurality of computing devices based on environmental and network characteristics of the one or more features, identifying, based on the one or more subsets and detected influencer activities, co-located computing devices, and responsive to determining that a count of the co-located computing devices is greater than a predetermined count, sending a session terminating command to one or more servers in communication with the co-located computing devices to mitigate click farm fraudulent activities.

20 Claims, 10 Drawing Sheets

(56) References Cited

U.S. PATENT DOCUMENTS

| | | | | |
|---|---|---|---|---|
| 2007/0255821 | A1* | 11/2007 | Ge | H04L 67/54 709/224 |
| 2008/0126159 | A1* | 5/2008 | Wee | G06Q 30/0204 705/7.33 |
| 2008/0201214 | A1* | 8/2008 | Aaron | H04M 15/47 705/14.47 |
| 2014/0143304 | A1* | 5/2014 | Hegarty | H04L 67/01 709/203 |
| 2014/0169358 | A1* | 6/2014 | Krasniqi | H04W 4/12 370/338 |
| 2015/0112796 | A1* | 4/2015 | Greenzeiger | G06Q 30/0251 705/14.49 |
| 2019/0325478 | A1* | 10/2019 | Forsblom | G06F 21/552 |
| 2019/0333099 | A1* | 10/2019 | Sohum | H04L 63/101 |
| 2019/0333102 | A1* | 10/2019 | Sohum | G06Q 30/0248 |

OTHER PUBLICATIONS

C. Shi, R. Song, X. Qi, Y. Song, B. Xiao and S. Lu, "ClickGuard: Exposing Hidden Click Fraud via Mobile Sensor Side-channel Analysis," ICC 2020—2020 IEEE International Conference on Communications (ICC), Dublin, Ireland, 2020, pp. 1-6, https://ieeexplore.ieee.org/document/9149420?source=IQplus> (Year: 2020).*
S. Luo and S. Wan, "Leveraging Product Characteristics for Online Collusive Detection in Big Data Transactions," in IEEE Access, vol. 7, pp. 40154-40164, 2019, accessed at, <https://ieeexplore.ieee.org/document/8611468?source=IQplus> (Year: 2019).*
Shishir Nagaraja and Ryan Shah. 2019. Clicktok: click fraud detection using traffic analysis. In Proceedings of the 12th Conference on Security and Privacy in Wireless and Mobile Networks (WiSec '19). Association for Computing Machinery, New York, NY, USA, 105-116. https://doi.org/10.1145/3317549.3323407.

* cited by examiner

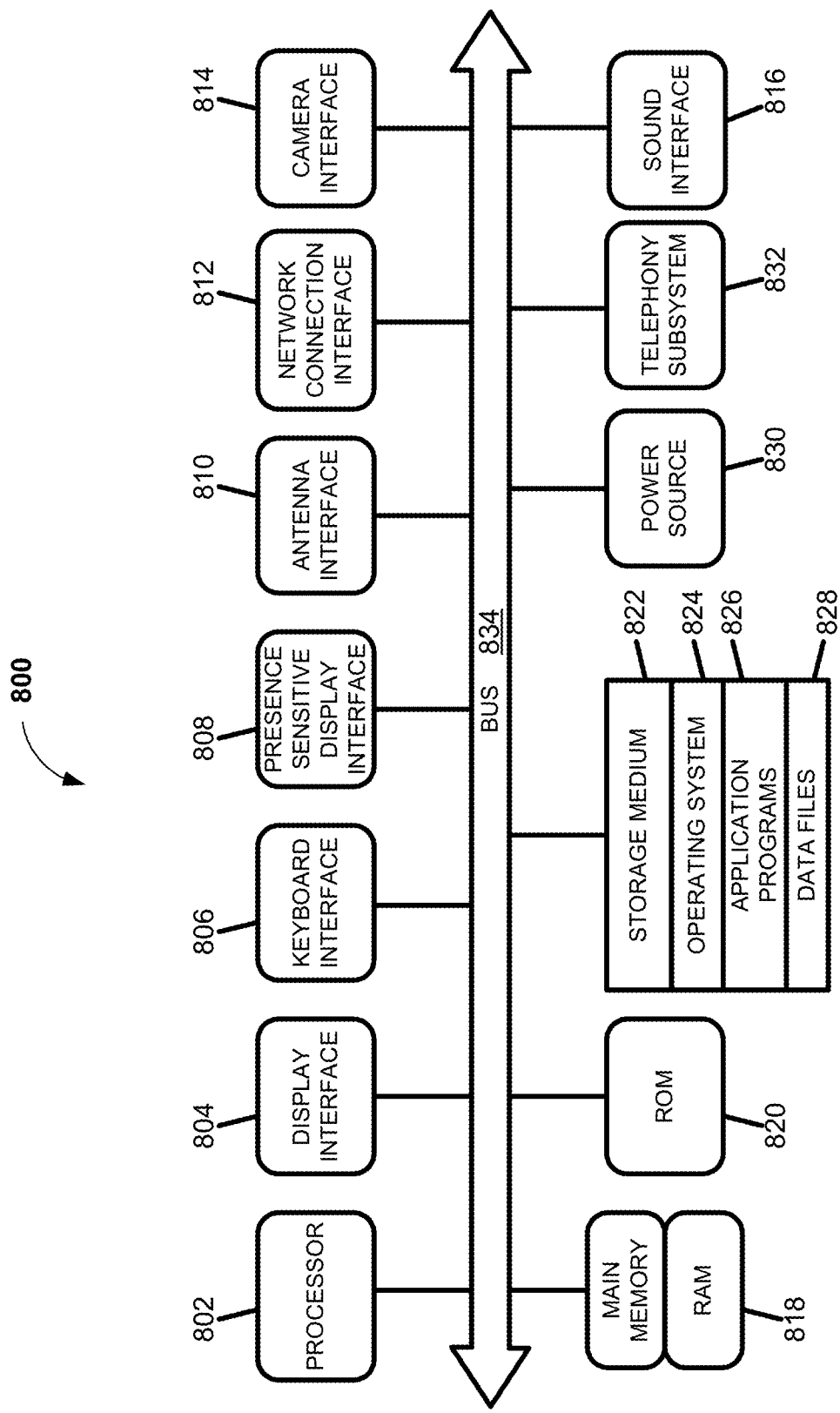

SYSTEMS AND METHODS FOR DETECTING AND MITIGATING CLICK FARM FRAUD

FIELD OF THE DISCLOSED TECHNOLOGY

The disclosed technology generally relates to mitigating internet fraud, and more particularly to systems and methods for detecting and preventing click farm fraudulent activities.

BACKGROUND

Click farms are systems that include multiple computing devices in a common area and typically operated by fraudsters to mimic the actions of multiple legitimate users to generate revenue for the fraudsters. FIG. 1 illustrates a typical click farm operation 100 in which multiple computing devices 102 are utilized by a fraudster 104 (or unwitting employee of the fraudster) to artificially mimic multiple people clicking on webpages and/or ads in targeted applications, leaving false reviews, or performing other interactions that can generate revenue. As illustrated in FIG. 1, the multiple computing devices 102 used in a click farms operation 100 are typically rack-mounted in a common area and continuously powered 106 for ease of accessibility by fraudsters 104.

As Illustrated in FIG. 2, click fraud can involve five parties: an advertiser 202, a publisher 204, an advertising network 206, a web server 210, and the click farm operator 104. The advertiser 202 submits advertisements for distribution by the advertising network 206, and the publisher 204 renders the advertisements to appear within a web page hosted by the web server 210. When a user clicks on an advertisement in a web page, the advertising network 206 receives the click indication, updates a billing account of the advertiser 203, and redirects the click to a URL determined by the advertiser 202. For each click on an advertisement, the advertiser 202 pays the advertising network 206, who in turn pays the publisher 204 and the web page owner a substantial fraction of the per-click revenue. The publisher 204 then pays the click farm operator 104. Therefore, a portion of the collected revenue is sent to the fraudulent click farm operator 104 without any benefit to the advertiser 204. It is estimated that click fraud causes losses to advertisers on the order of hundreds of millions of dollars per year.

Early attempts to combat click fraud relied on blacklisting publishers with high click volume and low reputation scores. But fraudsters can simply discard publishing accounts and quickly open new ones. Combating bot-related click farm fraud has been attempted by requiring users to complete visual CAPTCHA or other types of authentications that require human input. However, human click farm operators can easily complete such authentication when necessary. Businesses often have solutions in place to detect malicious automated activity but can struggle to detect the more subtle signs of human-driven fraud, particularly when the usage appears to be from multiple genuine users interacting with multiple devices. Furthermore, since click farm operators can use virtual private networks (VPNs), device spoofing, location spoofing, etc., to avoid detection, conventional methods offer no immediate and reliable ways to determine if the user is fraudulent or not.

Recently, certain behavioral biometrics algorithms have been used in an attempt to detect click farm activities. Such algorithms collect user behavior as they interact with a device and after a learning period, the probability that a new session stems from a known user can be calculated. However, since multiple devices in a click farm are typically operated by different fraudsters at different times (for example, a first fraudster may interact with multiple devices during a first shift, then a second fraudster may interact with the same multiple devices during a second shift, etc.,) learning a single user and single device behavioral profile is not effective in detecting such fraudulent activity. Even if the service provider suspects a subset of users is performing the fraud, comparing the behavioral profile across devices to compute a likelihood that the same actor is indeed handling multiple accounts requires lab-like data collection and handling, which is practically impossible to do. Thus, there is limited relevance to the process of learning the user behavior to combat certain types of click farm frauds.

There is a need for further improved detection and mitigation techniques for click farm fraud.

BRIEF SUMMARY

Certain exemplary implementations of the disclosed technology may include a method for detecting and mitigating click farm fraud.

In accordance with certain implementations of the disclosed technology, a method is provided for detecting and mitigating click farm fraud. The method can include receiving network data and sensor data from a plurality of computing devices, extracting one or more features from the sensor data and the network data for each of the plurality of computing devices, wherein the one or more features represent one or more of a local physical environment and communication channel environment associated with a device of the plurality of computing devices. The method includes determining, based on the one or more features, one or more subsets of the plurality of computing devices based on environmental and network characteristics of the one or more features, identifying, based on the one or more subsets and detected influencer activities, co-located computing devices, and responsive to determining that a count of the co-located computing devices is greater than a predetermined count, sending a session terminating command to one or more servers in communication with the co-located computing devices to mitigate click farm fraudulent activities.

In accordance with certain implementations of the disclosed technology, a another method is provided for remotely collecting network data and sensor data from a plurality of computing devices, sending the sensor data and the network data to a backend server, extracting one or more features from the sensor data and the network data, clustering the plurality of the computing devices into one or more subsets based on equivalent features of the one or more features, and identifying, based on the clustering, co-located devices of the one or more subsets. Responsive to determining a count of the co-located devices is greater than a predetermined count, the method includes sending a session terminating command to one or more servers in communication with the one or more co-located devices. In certain implementations, when the count of the co-located devices is greater than a predetermined count, an indication may be sent to an associated advertising network and/or publisher to provide an alert regarding the actual or potential click farm activities.

In accordance with certain implementations of the disclosed technology, a system is provided having a processor and memory having programming instructions stored thereon, which, when executed by the processor, cause the processor to receive network data and sensor data from a plurality of computing devices, extract one or more features from the sensor data and the network data for each of the plurality of computing devices, wherein the one or more features represent one or more of a local physical environment and communication channel environment associated with a device of the plurality of computing devices, determine, based on the one or more features, one or more subsets of the plurality of computing devices based on environmental and network characteristics of the one or more features, identify based on the one or more subsets and detected influencer activities, co-located computing devices, and send a session terminating command to one or more servers in communication with the co-located computing devices to mitigate click farm fraudulent activities responsive to determining that a count of the co-located computing devices is greater than a predetermined count.

In accordance with certain implementations of the disclosed technology, a system is provided having a processor and memory having programming instructions stored thereon, which, when executed by the processor, cause the processor to remotely collect network data and sensor data from a plurality of computing devices. The sensor data can include one or more of: location information, device orientation, device movement characteristics, ambient light conditions, and/or device battery charge. The network data can include one or more of: telecom network information, associated WiFi network information, and/or associated BLE devices. The programming instructions further instruct the processor to send the sensor data and the network data to a backend server, extract, by the backend server, one or more features from the sensor data and the network data, cluster the plurality of the computing devices into one or more subsets based on equivalent features of the one or more features, identify, based on one or more clusters, co-located devices of the one or more subsets, and responsive to determining a count of the co-located devices is greater than a predetermined count, send a session terminating command to one or more servers in communication with the one or more co-located devices to mitigate click farm fraudulent activities.

In accordance with certain implementations of the disclosed technology, a non-transitory computer-readable medium having stored thereon software instructions that, when executed by a processor, cause the processor to perform a method of remotely collecting network data and sensor data from a plurality of computing devices, sending the sensor data and the network data to a backend server, extracting one or more features from the sensor data and the network data, clustering the plurality of the computing devices into one or more subsets based on equivalent features of the one or more features, and identifying, based on the clustering, co-located devices of the one or more subsets. Responsive to determining a count of the co-located devices is greater than a predetermined count, the method includes sending a session terminating command to one or more servers in communication with the one or more co-located devices.

Certain implementations of the disclosed technology will now be described with the aid of the following drawings and the detailed description.

BRIEF DESCRIPTION OF THE DRAWINGS

FIG. 8 is a high-level block diagram of a processing system, in accordance with certain implementations of the disclosed technology.

The disclosed technology will now be described using the detailed description in conjunction with the drawings and the attached claims.

DETAILED DESCRIPTION

The systems and methods disclosed herein can enable the detection and mitigation of click farm fraud. Certain processes of the disclosed technology may monitor a plurality of computing devices and utilize each device's sensor data and/or associated network information to determine when multiple user sessions originate from a co-located subset of the plurality of devices. Certain implementations of the disclosed technology may extract certain features (such as motion, orientation, usage characteristics, etc.,) from the sensor data and/or network information as indicators for determining if a device is involved in a click farm.

Certain implementations of the disclosed technology may use clustering to identify devices having similar extracted features. For example, multiple devices that are stationary, supplied with external power, active at the same time, use a common digital service provider, etc., may be indicative of a click farm. In certain implementations, the disclosed technology may utilize general sensor data from the device instead of unreliable indicators such as DNS data, IP address, or location data, which can be spoofed. Certain implementations of the disclosed technology can enable detection and mitigation of some types of fraud automatically without requiring manual review.

In accordance with certain exemplary implementations, a device may be (potentially or actually) associated with a click farm when it is part of a cluster of devices that are determined to be co-located, stationary, and/or exhibiting similar sensor/network characteristics. In certain implementations, a confidence metric indicating the actual association of a device with a click farm may increase with the cluster size n. Similarly, a selectable number N may be input as a threshold for ignoring or suppressing clusters that contain device count n less than N, for example, to reduce false positives.

In accordance with certain exemplary implementations of the disclosed technology, when a device is determined to be part of click farm, various mitigation procedures may be implemented to prevent and/or reduce associated click fraud. For example, in one implementation, an indication can be sent to an Enterprise WebServer in communication with the click farm device to terminate the device's session. In another example implementation, an indication can be sent to the Advertising Network and/or the Publisher to ignore clicks coming from the click farm device. Certain additional details regarding such mitigation will be further discussed below with reference to the figures.

Figure 1:
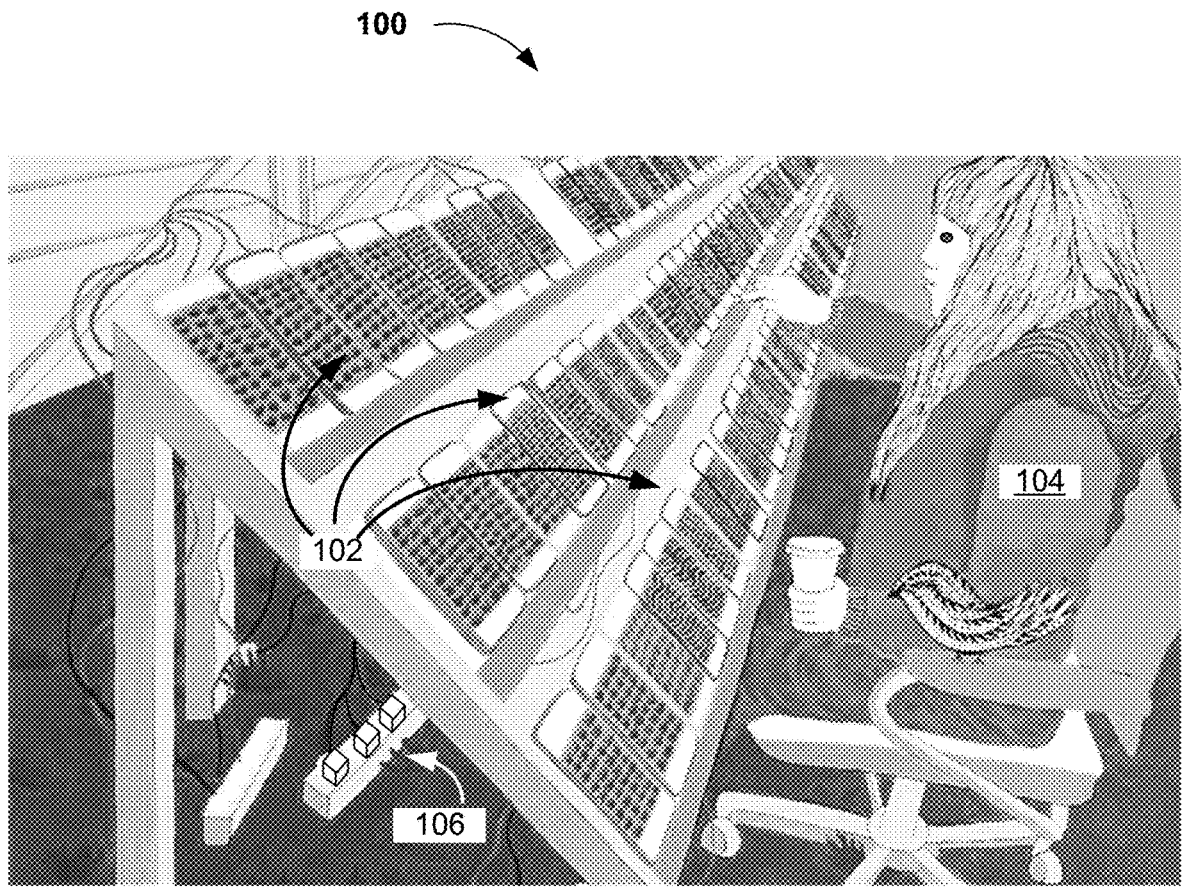
FIG. 1 is an illustration of a typical click farm operation in which multiple computing devices are utilized by a fraudster to artificially mimic multiple people clicking on webpages and/or ads in targeted applications, leaving false reviews, or performing other interactions that can generate revenue.
Figure 2:
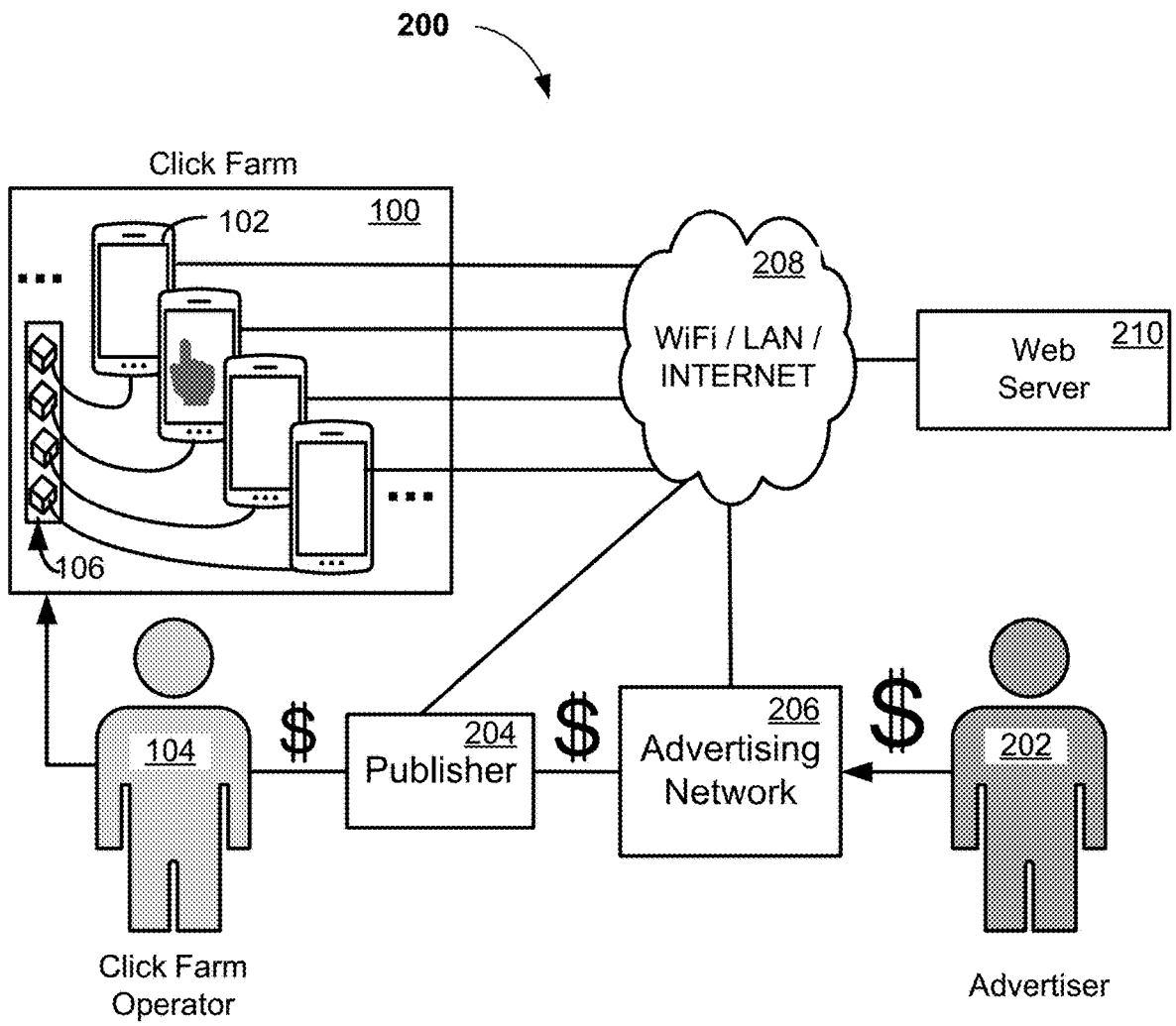
FIG. 2 illustrates a typical scenario in which an advertising network may collect revenue from an advertiser based on the volume of click traffic to targeted advertisements and a portion of the collected revenue is sent to the click farm operator.
Figure 3:
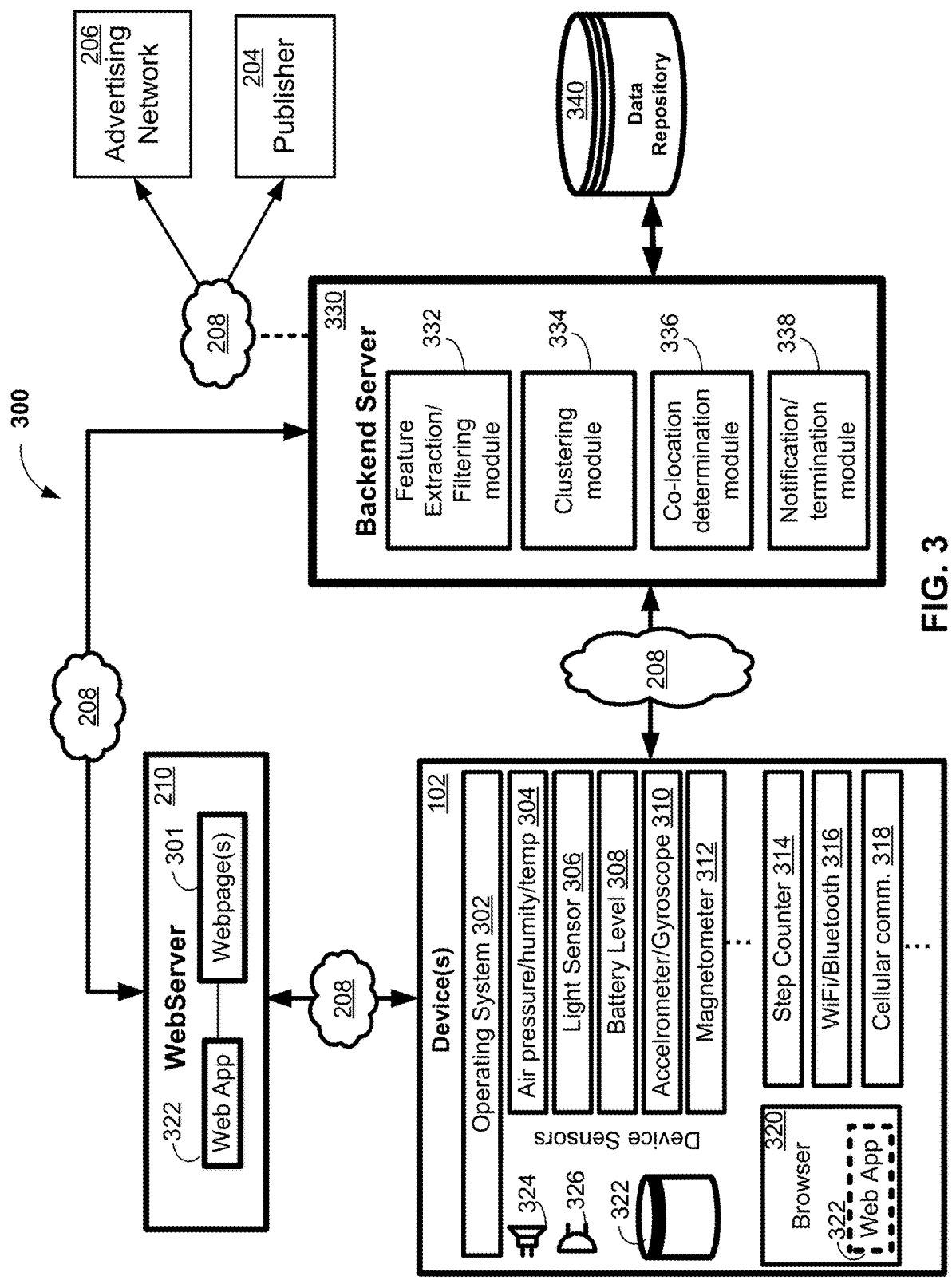
FIG. 3 is a block diagram illustration of an example system for detecting click farm activity and mitigating associated fraud, in accordance with certain exemplary implementations of the disclosed technology.

FIG. 3 is a block diagram illustration of an example system 300 for detecting click farm activity and mitigating associated fraud, in accordance with certain exemplary implementations of the disclosed technology.

The system 300 can include a Backend Server 330 that can communicate with a WebServer 210 that hosts webpages 301 and serves them, for example, to one or more computing device(s) 102, which in certain implementations, may be a smartphone, tablet, laptop computer, etc. As illustrated in FIG. 3, the mobile device 102 can include an operating system 302, memory 322, and various sensors, that can include air pressure/humidity/temperature sensors 304, light sensors 306, a battery level sensor 308, and accelerometer/gyroscope 310, a magnetometer 312, etc. The mobile device 102 can also include various applications such as a step counter 314, WiFi/Blutooth applications 316, cellular communication applications 318, a web browser 320, etc. The mobile device 102 can further include a speaker 325 and a microphone 326, In certain implementations, when the device 102 accesses the webpage 301 hosted by the WebServer 210, a Web Application 322 (Web App) stored on the WebServer 210 may be delivered over the communication network 208 to the device 102 (through a browser interface, for example) and to the browser 320 of the device 102. In some instances, Software Development Kits (SDK) and/or Application Programming Interfaces (API) may be used in place of or in conjunction with the Web App 322.

In accordance with certain exemplary implementations of the disclosed technology, when the device 102 begins accessing the webpage 301 and the Web App 322 is instantiated in the web browser 320 of the device 102, the Web App 322 may begin monitoring/recording data and or information from certain sensors and/or applications of the device 102. In implementations, the Web App 322 may utilize the device operating system 302 and/or memory to temporarily store the data recorded from the one or more sensors.

Figure 7A:
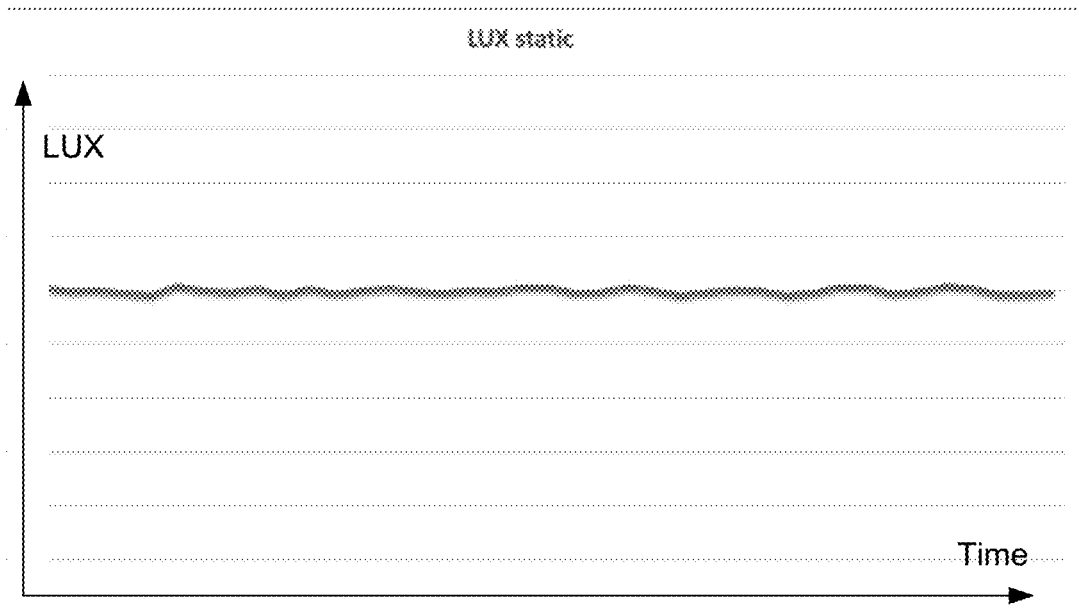
FIG. 7A illustrates an example time series of data representation of LUX vs Time for a device light sensor when the device is stationary.
Figure 7B:
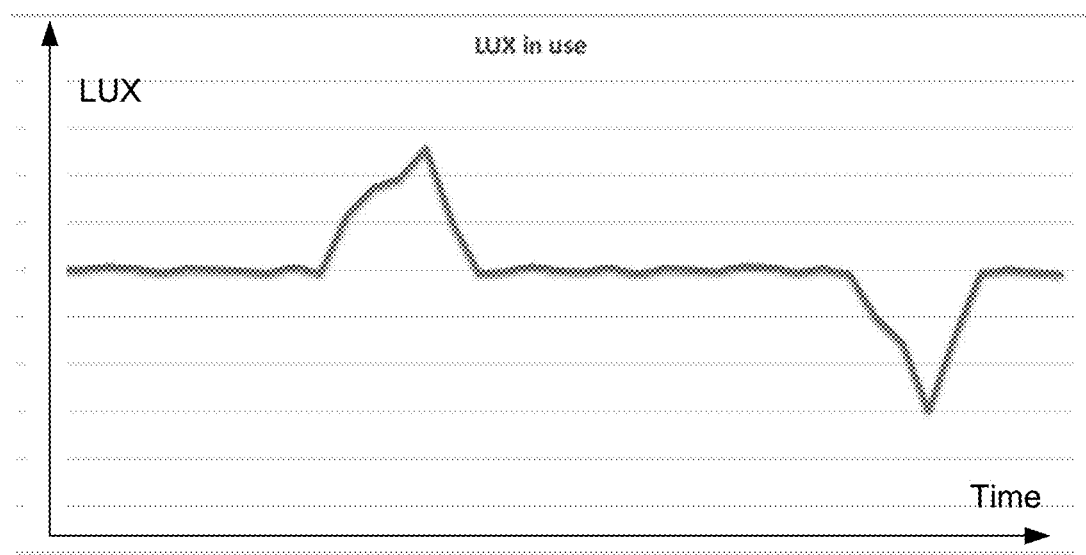
FIG. 7B illustrates an example time series of data representation of LUX vs Time for a device light sensor when the device is not stationary.

As will be further discussed in reference to FIGS. 7A and 7B below, in some instances, the recorded data may be in the form of a time series of (sampled) data that can indicate movement or other changes over time. Tor example, the time series can represent tilt and/or movement of the device (via the accelerometer/gyroscope 310), the ambient air pressure/humidity/temperature (via the corresponding pressure/humidity/temperature sensors 304), the ambient light level (via the light sensor 306, as illustrated in FIGS. 7A and 7B), an indication of the battery charge and/or whether the device 102 is being powered by a power supply (via the battery level sensor 308), the local magnetic field strength (via the magnetometer 312) Furthermore, the Web App 322 may utilize the device operating system 302 and/or memory to temporarily store network information, such as local WiFi network SSID, signal strength, name, Bluetooth device information (via the WiFi/Bluetooth application 316), and/or cell tower communication information (via the cellular communication application 318). In certain implementations, certain applications on the device 102, such as the step counter application 314, may be accessed by the Web App 322 to detect any step-like movement since the last reset of the step counter.

In accordance with certain exemplary implementations of the disclosed technology, the Webb App 322 may further be configured to detect interaction data and/or influencer activities performed by an operator of the device 102. Such influencer activities may include, but are not limited to clicking on an advertisement, sharing a link, promoting certain content, leaving a review for a product or service.

In accordance with certain exemplary implementations of the disclosed technology, certain select data and/or information recorded from the various device 102 sensors and/or applications may be transmitted to the Backend Server 330 via the communication network 208 for further processing and/or analysis. It should be appreciated by those having skill in the art that the various native sensors and applications on the device 102 may each output data that can rapidly fill up the device memory 322 and/or negatively impact the available communication bandwidth of the device 102, particularly if each data stream is sampled at a high rate and the associated raw data is sent to the Backend Server 330. Thus, according to certain implementations, the Web App 322 may be configured to adjust the sampling rate of some or all of the associated time-series data and/or filter the data before it is sent to the Backend Server 330. In certain implementations, a data repository 340 in communication with the Backend Server 330 may be utilized to store various datasets, time series, features, etc. In certain implementations, the data may be low pass filtered, for example, to reduce certain higher frequency artifacts or noise. In certain implementations, some data or information may be discarded, for example, before it is sent to the Backend Server 330.

In accordance with certain exemplary implementations of the disclosed technology, once the monitored/recorded/filtered data and or information from the sensors and/or applications of the device 102 arrives at the Backend Server 330, a feature extraction/filtering module 332 may be utilized to further filter the incoming time series of data and/or extract certain features from the incoming time series data and/or other information. Such features can include network names, cellular tower identifiers, steps since last reset, etc.).

In accordance with certain exemplary implementations of the disclosed technology, and as will be further discussed below with reference to FIG. 5, certain extracted features for a particular device 102 may be clustered with extracted features of other monitored devices by the clustering module 334. Such clustered information may be used by the Co-location determination module 336 to determine devices that are co-located, for example, based on their feature similarity with other monitored devices.

In accordance with certain exemplary implementations of the disclosed technology, a Notification/termination module 338 may be utilized to mitigate further potential fraud, for example, by generating and sending an indication to one or more of the WebServer 210, the Advertising Network 206, and/or the Publisher 204 when it is determined that a device 102 is part of a click farm. In certain implementations, mitigation indication can take several alternative forms. For example, in one embodiment, the mitigation indication generated by the Notification/termination module 338 can be in the form of an instruction for the WebServer 210 to terminate the current browsing session with the device 102 to prevent additional fraudulent clicks.

In other implementations, the mitigation indication generated by the Notification/termination module 338 can be in the form of an instruction to the Advertising Network 206 and/or the Publisher 204 that the particular device 102 is suspected of being part of a click farm, which may cause the Advertising Network 206 and/or the Publisher 204 to ignore clicks coming from that particular device. Many other mitigation steps may be taken without departing from the scope of the disclosed technology.

Figure 4:
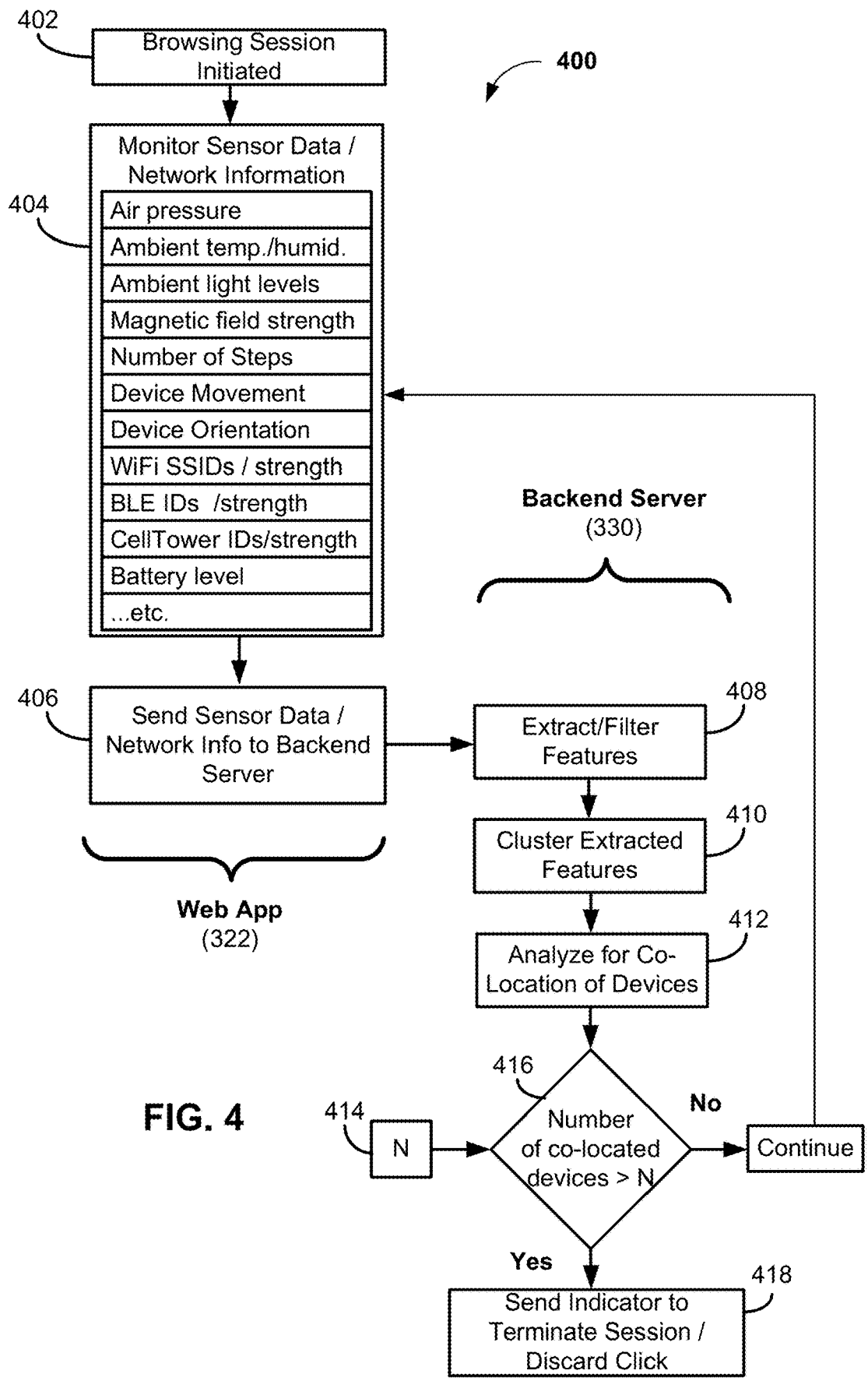
FIG. 4 illustrates an example process that may be used to detect and mitigate click farm activity, in accordance with certain exemplary implementations of the disclosed technology.

FIG. 4 illustrates an example process that may be used to detect and mitigate click farm activity, in accordance with certain exemplary implementations of the disclosed technology. In block 402, a browsing session may be initiated between a device and a WebServer. In block 404 various sensors and/or applications of the device may be monitored/recorded. In accordance with certain exemplary implementations of the disclosed technology, various identifiers, amounts, and/or statistical measures, such as average, variance, skewness, and/or kurtosis be extracted from the various sensors and/or network information and utilized in the analysis to determine a particular device's use in a click farm. For example, identifiers (such as SSIDs, Cell Tower ID's, etc.,) of routers/devices/towers around a stationary device may be utilized in the analysis. Furthermore, various metrics for signal strength in a time series and calculated statistics on those metrics may be utilized, as will be further discussed with reference to FIGS. 6A-7B below.

With continued reference to FIG. 4, in block 406, certain sensor data/statistics and/or network information and/or time series of data may be sent to a Backend Server. In accordance with certain exemplary implementations of the disclosed technology, blocks 402, 404, and 406 may be handled under the direction of a Web App (as discussed above).

In accordance with certain implementations of the disclosed technology, the sensor data/statistics and/or network information and/or time series of data can include interaction data and/or influencer activities, which may include, but are not limited to clicking on an advertisement, sharing a link, promoting certain content, leaving a review for a product or service, etc.

In block 408, the Backend Server may extract and/or filter the incoming data/info to extract certain features from the data. In block 410, the extracted data may be clustered, for by similar features extracted from other devices. In block 412 the clustered data may be analyzed for actual or potential co-location of devices that are performing influencer activities indicative of a click farm. In certain implementations, a plurality of different features may be analyzed for like clustering with other devices to increase the confidence level of co-location determination. In block 414, one or more parameters may be utilized to set a threshold for block 416 to determine the minimum number of detected co-located devices that are needed before declaring that a particular device is part of a click farm. In block 418, when the device is determined to be part of a click farm, an indication may be sent to terminate an associated browsing session, discard a click, etc. Otherwise, the process 400 may continue to gather and analyze the data.

Figure 5B:
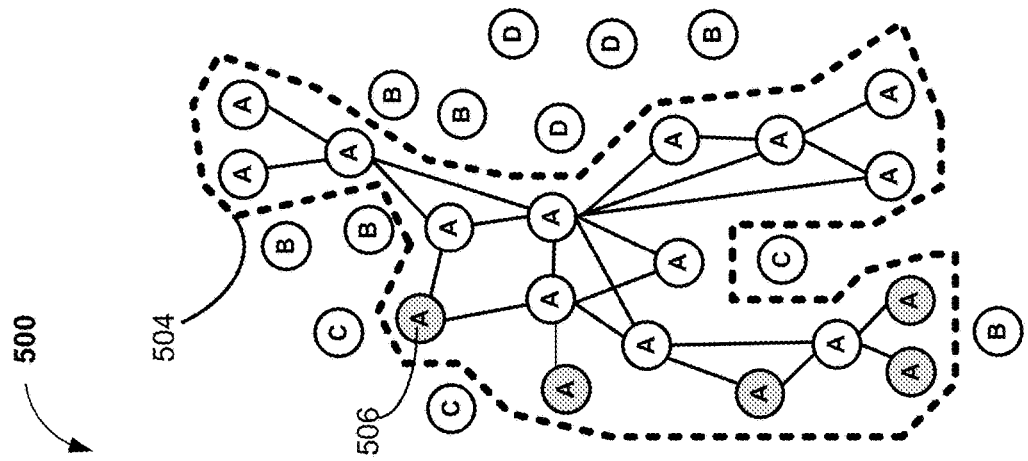
FIG. 5B illustrates an example graphical representation of refined clustering, in which additional extracted features may be evaluated for involvement in the same click farm, in accordance with certain exemplary implementations of the disclosed technology.
Figure 5A:
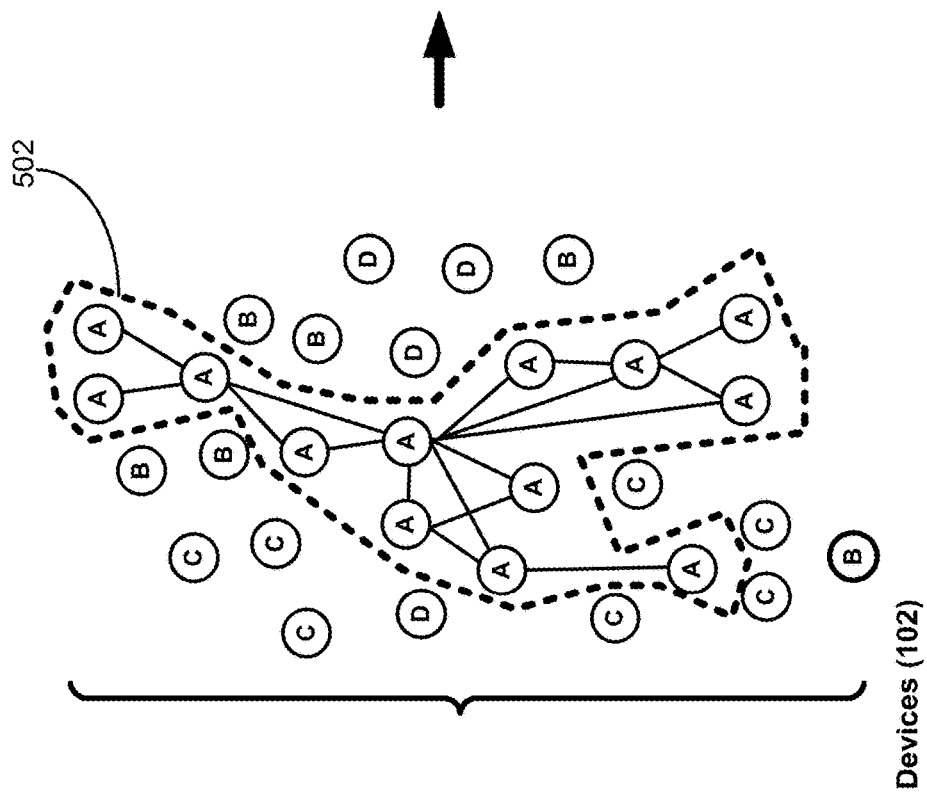
FIG. 5A is an illustration of initial clustering that may be utilized to detect co-located devices in a click farm activity, in accordance with certain exemplary implementations of the disclosed technology.

FIG. 5A illustrates an example graphical representation of an initial clustering process, according to an example implementation of the disclosed technology, in which certain devices may be clustered 502 based on extracted features (as discussed above) that are indicative of involvement in the same click farm. Each of the circles, for example, may represent a distinct device of a plurality of devices 102 (such as a device 102 in communication with a WebServer 210 and in further communication with the Backend Server 330 via the Web App 320 as discussed above with reference to FIG. 3). In accordance with certain exemplary implementations of the disclosed technology, and for illustration purposes, a unique clustering identifier (such a A, B, C, D, . . . ) may be assigned to each distinct device of the plurality of devices 102 based on similar extracted features. In certain implementations, the associated features may be processed and compared to determine linkages or relationships among the features. In certain implementations, the "relationships" among the various devices 102 may be represented (for illustration purposes) as connecting lines (edges). In certain implementations, the edges may also have weights representing similarity measures of features with other devices 102 in like groupings.

In certain example embodiments, each of the devices 102 may have multiple extracted and associated features (not shown) and may therefore be represented as nodes in a hyperspace. In one example implementation, the clustering identifiers may relate to those devices that are stationary, supplied with external power, active at the same time, use a common digital service provider, performing influencer activities, etc. Thus, an initial cluster 502 may be identified as including the devices 102 that share the common features.

An example of an initial cluster 502 is depicted having a dotted outline to distinguish the devices of the cluster from the remaining devices. The initial cluster 502, as depicted in this example, are shown sharing a common identifier: "A," along with connections that may represent any number of scenarios, according to certain example embodiments of the disclosed technology. For example, the "A" identifier and the connecting edges may represent certain extracted feature commonalities.

FIG. 5B illustrates an example graphical representation of a refined cluster 504, in which additional extracted features may be evaluated for involvement in the same click farm. In accordance with an example implementation, for any particular feature, the general process of clustering devices may be refined with each iteration by assuming that all the other devices and relationships are correct, performing one clustering iteration, then moving on to the next feature, performing one clustering iteration, and so forth. For example, each device 102 may be evaluated with respect to a particular feature and a cluster 506 of records may be identified as having certain quantitative or qualitative relationships to the particular extracted features of interest. As illustrated in FIG. 5B, certain devices 506 (as indicated by the dark shading) may be included in the refined cluster 504 (and have their associated cluster identifier changed to match the group) as additional or different extracted features are evaluated.

To arrive at the new cluster 504, certain example implementations may utilize a first iteration process whereby records with "A" attributes are clustered while noting relationships (edges and weights, for example) between those records having "C" features, and vice-versa. For example, starting with the initial cluster 502, features, attributes or commonalities may be evaluated to aggregate one or more relationships between any of the devices 102. As depicted in FIG. 5B, and based on relationships and/or other criteria among the devices 102, the new cluster 504 may be formed in the re-clustering step and may include certain devices of the first iteration cluster 502 while omitting certain devices. In an example implementation, the re-clustering refinements may be based, at least in part, on associating mutually matching features of the initial clusters. In another example implementation, the re-clustering may be based, at least in part, on determining similarity among corresponding extracted features. In another example implementation, the re-clustering may be based, at least in part, on detecting influencer activities.

According to an example implementation of the disclosed technology, determining similarity among the corresponding extracted features of the devices 102 may include assigning a hyperspace attribute to each device 102. The hyperspace attribute that corresponds to two devices may correlate with a similarity of the corresponding extracted feature(s). In certain example embodiments, membership of each device in a plurality of hyperspace clusters may be determined based at least in part on the hyperspace attributes. According to an example implementation each device 102 may be assigned a cluster ID and a match value reflecting a likelihood that the device is a member of a particular hyperspace cluster, and related devices may be linked based at least in part on the cluster ID and match value (as depicted by the edges joining the nodes in FIG. 5A and FIG. 5B). Determining membership of each device in the plurality of hyperspace clusters, for example, may include creating a plurality of nodes at random locations in hyperspace, each node maintaining devices in hyperspace based on the hyperspace attribute for which it is the closest node.

In accordance with certain implementations of the disclosed technology duplicate devices may be eliminated by merging those database records that have hyperspace attribute differences within a predefined criteria resulting in a reduced set of devices. In accordance with an example implementation, the process may further include recalculating the field value weights for the reduced set of devices, and re-clustering the reduced set of devices based at least in part on the recalculated field value weights.

According to an example implementation, of the disclosed technology, the clustering, iterating, recalculating, and re-clustering etc. may produce a set of refined clusters in which the devices in a given set possess criteria that resemble the other devices in the set. Such clustering may provide useful characteristics, categories, structures, features, etc., for detecting a click farm and/or the involvement of a particular device in the click farm.

FIGS. 6A-7B illustrates example extracted features that may be utilized for evaluating whether a device is part of a click farm.

Figure 6A:
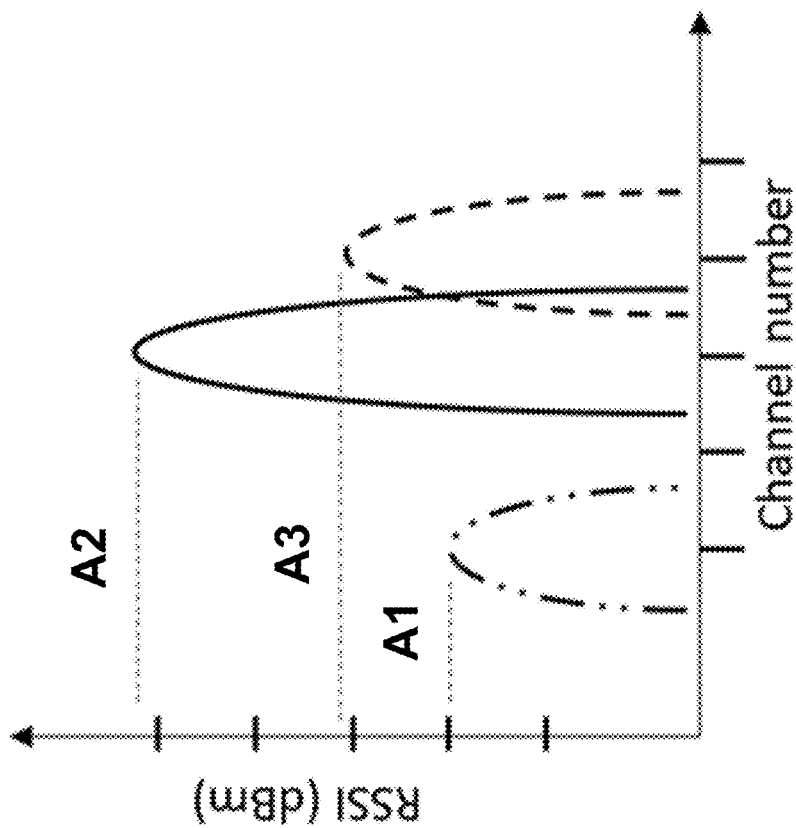
FIG. 6A illustrates WiFi channel positions and signal strength as measured by a first device.
Figure 6B:
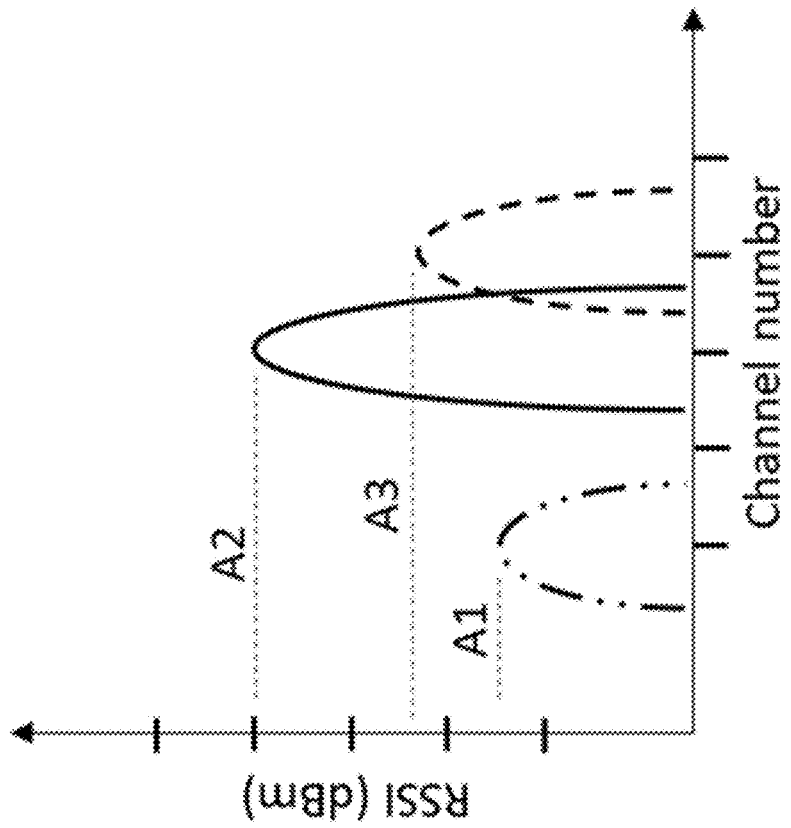
FIG. 6B illustrates WiFi channel positions and signal strength as measured by a second device that may be co-located with the first device referenced in FIG. 6A.

FIG. 6A illustrates an example of nearby WiFi channel positions (x-axis), signal strengths (y-axis) and SSID names (A1, A2, A3) as measured and reported by a first device. FIG. 6B illustrates nearby WiFi channel positions, signal strength, and SSID names as measured and reported by a second device. Certain implementations of the disclosed technology may evaluate the relative or normalized sign strength, channel positions, SSID names, etc., to determine if the first and second devices are co-located. In the examples shown in FIG. 6A and FIG. 6B, the two devices may be considered co-located since the channel positions, relative strengths, and SSID names are the same.

FIG. 7A illustrates an example of LUX vs Time (time series) as measured by a light sensor and reported by a first device. Such time series may be indicative of a stationary device. FIG. 7B illustrates an example of LUX vs Time (time series) as measured by a light sensor and reported by a second device. Such time series may be indicative of a device that is subject to different light conditions, either by movement or changes in ambient light conditions. In certain implementations (and in contrast to the similar WiFi features illustrated in FIGS. 6A and 6B), when two separate devices report different LUX vs Time features, such differences may be an indication that the two devices are not co-located.

Passive Discovery

As discussed above, and referring again to FIG. 3, certain sensor data may be collected from a set of devices 102 and sent to the Backend Server 330. The set of devices 102 can be all mobile devices active on a certain day, for example, and evaluation/clustering may be performed in a nightly batch job, selected from a geographical region, and or based on any other cohort of users' data and/or extracted features. In certain implementations, the sensor data can include low-level time series of sensor readings, filtered sensor values, and/or higher-level aggregate estimates produced by the devices' operating systems.

Using the time-series of sensor data, features that describe the devices' locality and behavior may be extracted. As discussed above, such features can comprise current and historical data of orientation, movement, light, battery charge, telecom networks, WiFi and BLE devices, and which page, content, or actions performed by the users. User activity can include time series data sets as measured by the device accelerometer, gyroscope, and/or magnetometer. In certain implementations, high-level aggregates like a step counter may be included as a feature for evaluation. The resulting dataset may be run through a clustering algorithm to find subsets of devices that share a set of parameters for a time period (as discussed above with respect to FIGS. 5A and 5B). For example, a selection of a couple of dozen devices all sharing the same orientation angles in space while being stationary could constitute an easily differentiable pattern. These devices could also share a static battery charging history, similar light readings, and magnetometer readings. Even if they display different IP and geolocation data, the low-level data may display sufficient similarity to enable detection.

Another example of data and/or extracted features that can be used to identify the approximate co-location of several devices is given by the WiFi nearby devices data, as discussed above with reference to FIGS. 6A and 6B. In one implementation, the BackEnd Server 330 may utilize WiFi network scans made by the devices such that from each device, the Service Set Identifiers (SSIDs) and the RSSI (Received Signal Strength Indicator, i.e. the received power) and channel number of each detected WiFi access point (AP) are stored in a Data Repository 340 in communication with the Backend Server 330. Successive readings may be concatenated to make up a time-wise representation for the periodic WiFi readings, which may form a history of the network environment the device has traversed. In accordance with certain exemplary implementations of the disclosed technology, and after a deprecation period, the oldest data may be discarded, i.e. the values may be stored in a sliding time window. In this case, a clustering algorithm may not even be needed if two or more devices are registering the same SSID. In some implementations, the full time-series of the received RSSIs for each SSID and channel number can be vectorized and a determination of the statistical distance between them, e.g. via a Hamming, Euclidean, Wasserstein or any other statistical distance metric can be used directly. If the distances between a set of two or more devices are below a threshold, i.e. they exhibit the same or similar RSSI values, a determination is made that the devices are proximal to each other. In one embodiment, the sensor time series data is low-pass filtered to reflect the unnaturally long durations that a rack-mounted device will exhibit when stationary.

In another example embodiment, a cell tower IDs that the devices detect may be requested, and a similar as discussed above may be implemented. Mobile devices, for example, in 3G, 4G and 5G keep track of at least the three strongest cell IDs with short periodicity which means that co-location between devices would be quite accurate. Cell towers are also mapped out over the entire world and can be geographically located which facilitates further investigation for fraud teams or the like. Thus, a determination of a suspected click farm can be made on the amount of similar or exact same devices.

Active Discovery

In another embodiment, after the Backend Server 330 makes a determination that a set of devices are possibly co-located, the Backend Server 330 can make an active probing attempt to determine if the devices are proximal or not. Such probing, for example, may be conducted as a confirmation after one of the passive mode discovery embodiments have been carried out.

Active discovery can be done in several ways. For example, in a first implementation, the Backend Server 330 may instruct (via the Web App 322) one of the devices to play an (possibly inaudible) audio signal while instructing the other devices to register the response via by either their microphones or magnetometer sensors. In another implementation, the Backend Server 330 may instruct one of the devices to illuminate the surroundings with device-based LIDAR while instructing the other devices to register the response by measuring a response. In certain implementations, interference may be measured as different other devices are turned on. Similarly, other active discover utilizing NFC or Bluetooth sender/receiver schemes may be utilized in a similar manner without departing from the scope of the disclosed technology.

In certain implementations, the active or passive discovery measurements or readings may be enabled by a least number of user-granted permissions. In certain implementations, successive permission layers may be utilized to allow for richer sensor data that enables improved accuracy.

FIG. 8 depicts a block diagram of an illustrative computing device 800 that may be utilized to enable certain aspects of the disclosed technology. Various implementations and methods herein may be embodied in non-transitory computer-readable media for execution by a processor. It will be understood that the computing device 800 is provided for example purposes only and does not limit the scope of the various implementations of the communication systems and methods.

The computing device 800 of FIG. 8 includes one or more processors where computer instructions are processed. The computing device 800 may comprise the CPU 802, or it may be combined with one or more additional components shown in FIG. 8. In some instances, a computing device may be a processor, controller, or central processing unit (CPU). In yet other instances, a computing device may be a set of hardware components.

The computing device 800 may include a display interface 804 that acts as a communication interface and provides functions for rendering video, graphics, images, and texts on the display. In certain example implementations of the disclosed technology, the display interface 804 may be directly connected to a local display. In another example implementation, the display interface 804 may be configured for providing data, images, and other information for an external/remote display. In certain example implementations, the display interface 804 may wirelessly communicate, for example, via a Wi-Fi channel or other available network connection interface 812 to the external/remote display.

In an example implementation, the network connection interface 812 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 804 may be operatively coupled to a local display. In another example, the display interface 804 may wirelessly communicate, for example, via the network connection interface 812 such as a Wi-Fi transceiver to the external/remote display.

The computing device 800 may include a keyboard interface 806 that provides a communication interface to a keyboard. According to certain example implementations of the disclosed technology, the presence-sensitive display interface 808 may provide a communication interface to various devices such as a pointing device, a touch screen, etc.

The computing device 800 may be configured to use an input device via one or more of the input/output interfaces (for example, the keyboard interface 806, the display interface 804, the presence-sensitive display interface 808, the network connection interface 812, camera interface 814, sound interface 816, etc.,) to allow a user to capture information into the computing device 800. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 800 or may be a separate device. For example, the input device may be an accelerometer, a magnetometer, a digital camera, a microphone, and an optical sensor.

Example implementations of the computing device 800 may include an antenna interface 810 that provides a communication interface to an antenna; a network connection interface 812 that provides a communication interface to a network. According to certain example implementations, the antenna interface 810 may be utilized to communicate with a Bluetooth transceiver.

In certain implementations, a camera interface 814 may be provided that acts as a communication interface and provides functions for capturing digital images from a camera. In certain implementations, a sound interface 816 is provided as a communication interface for converting sound into electrical signals using a microphone and for converting electrical signals into sound using a speaker. According to example implementations, random-access memory (RAM) 818 is provided, where computer instructions and data may be stored in a volatile memory device for processing by the CPU 802.

According to an example implementation, the computing device 800 includes a read-only memory (ROM) 820 where invariant low-level system code or data for basic system functions such as basic input and output (I/O), startup, or reception of keystrokes from a keyboard are stored in a non-volatile memory device. According to an example implementation, the computing device 800 includes a storage medium 822 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, a widget or gadget engine, and or other applications, as necessary) and data files 828 are stored. According to an example implementation, the computing device 800 includes a power source 830 that provides an appropriate alternating current (AC) or direct current (DC) to power components. According to an example implementation, the computing device 800 includes a telephony subsystem 832 that allows the computing device 800 to transmit and receive sound over a telephone network. The constituent devices and the CPU 802 communicate with each other over a computer bus 834.

In accordance with an example implementation, the CPU 802 has an appropriate structure to be a computer processor. In one arrangement, the computer CPU 802 may include more than one processing unit. The RAM 818 interfaces with the computer bus 834 to provide quick RAM storage to the CPU 802 during the execution of software programs such as the operating system application programs, and device drivers. More specifically, the CPU 802 loads computer-executable process steps from the storage medium 822 or other media into a field of the RAM 818 to execute software programs. Data may be stored in the RAM 818, where the data may be accessed by the computer CPU 802 during execution. In one example configuration, the computing device 800 includes at least 128 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the computing device 800 to access computer-executable process steps, application programs, and the like, stored on removable and non-removable memory media, to off-load data from the computing device 800 or to upload data onto the computing device 800. A computer program product, such as one utilizing a communication system may be tangibly embodied in storage medium 822, which may comprise a machine-readable storage medium.

According to one example implementation, the term computing device, as used herein, may be a CPU, or conceptualized as a CPU (for example, the CPU 802 of FIG. 8). In this example implementation, the computing device (CPU) may be coupled, connected, and/or in communication with one or more peripheral devices.

It should also be understood by one skilled in the art that one or more of the devices depicted in FIG. 3 may be implemented as a computing device 800 such as is shown in FIG. 8.

Figure 9:
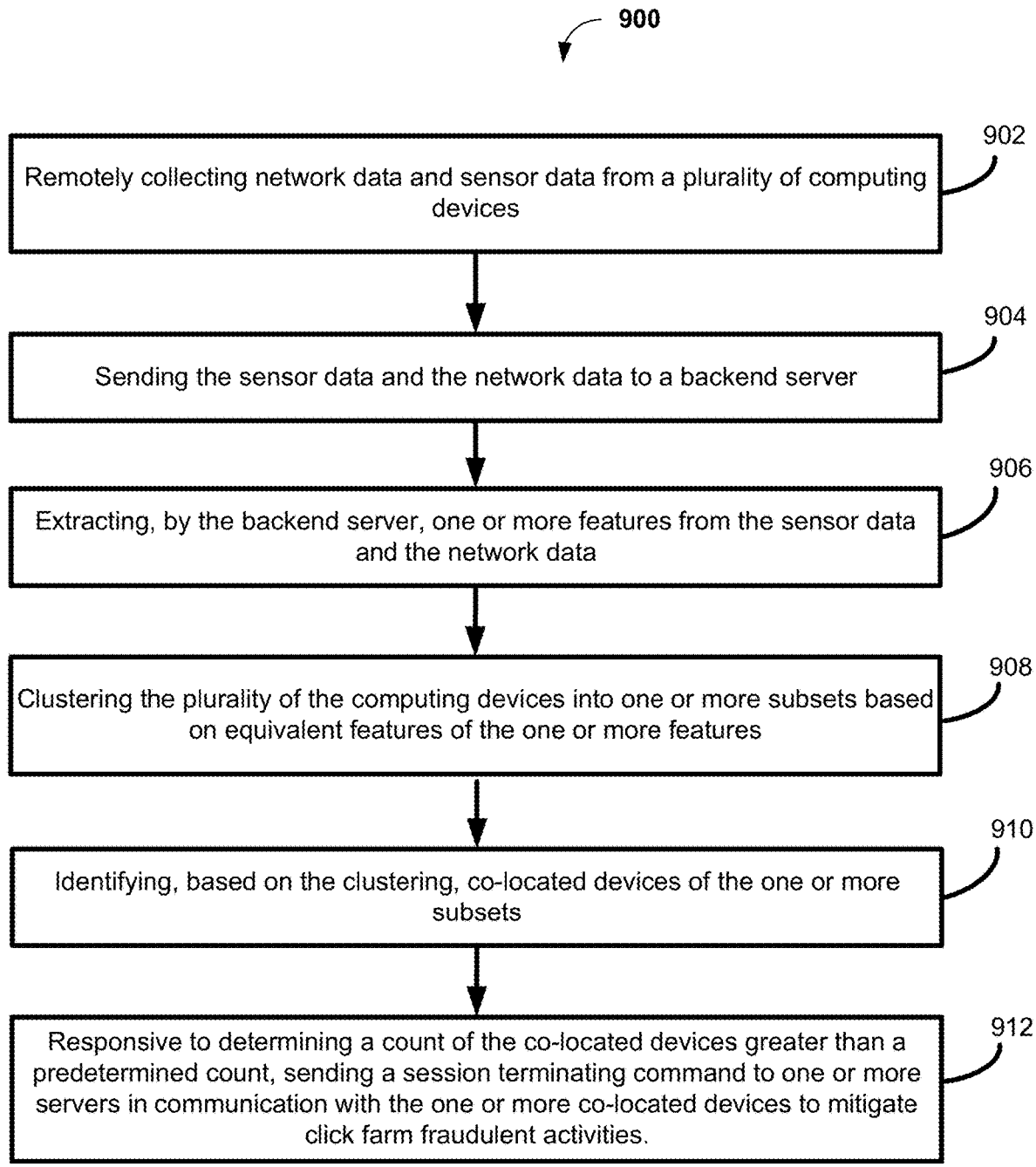
FIG. 9 is a flow diagram of a method, in accordance with certain implementations of the disclosed technology.

FIG. 9 is a flow diagram of a method 900 for detecting and mitigating click farm fraud, in accordance with certain implementations of the disclosed technology. In block 902, the method 900 includes remotely collecting network data and sensor data from a plurality of computing devices. In certain implementations the sensor data can include one or more of location information, device orientation, device movement characteristics, ambient light conditions, and device battery charge. In certain implementations, the network data can include one or more of telecom network information; associated WiFi network information, and associated BlueTooth (BLE) devices.

In block 904, the method 900 can include sending the sensor data and the network data to a backend server. In block 906, the method 900 can include extracting, by the backend server, one or more features from the sensor data and the network data. In block 908, the method 900 can include clustering the plurality of the computing devices into one or more subsets based on equivalent features of the one or more features. In block 910, the method 900 can include identifying, based on the clustering, co-located devices of the one or more subsets. In block 912, and responsive to determining a count of the co-located devices is greater than a predetermined count, the method 900 can include sending a session terminating command to one or more servers in communication with the one or more co-located devices to mitigate click farm fraudulent activities.

In certain implementations, the clustering may be based on substantially equivalent features of the one or more features over a predetermined time period.

Certain implementations of the disclosed technology can include alerting one or more of a WebServer, an Advertising Network, and a Publisher when a device is determined to be one of the one or more co-located devices.

In accordance with certain exemplary implementations of the disclosed technology, the features extracted can further include one or more of nearby device WiFi data comprising Service Set Identifiers (SSIDs) and Received Signal Strength Indicator (RSSI) values of detected WiFi access points.

In certain implementations, a statistical distance between one or more of SSID values and RSSI values may be further utilized for identifying the co-located devices.

In certain implementations, the one or more extracted features can include cell tower identifiers. In certain implementations, a statistical distance between the cell tower identifiers may further be utilized to identify co-located devices.

In certain implementations, the sensor data may be a time-series data.

In certain implementations, the time-series of data may be low-pass filtered to detect unnaturally long durations exhibited by rack-mounted devices when stationary.

Certain implementations of the disclosed technology may further include confirming a proximal arrangement of the one or more subsets of devices via actively probing. In certain implementations, the actively probing can include instructing a first device of the co-located devices of the one or more subsets to emit a signal and measuring an associated response from other devices of the co-located devices of the one or more subsets. In certain implementations, the associated response from the other devices can include measuring using one or more of a microphone and a magnetometer sensor.

In certain implementations, the sensor date may include higher-level aggregate estimates produced by an operating system of the device.

In certain implementations, the sensor data may be collected from a selected geographical region or a cohort of user data to identify the co-located devices of the one or more subsets.

Figure 10:
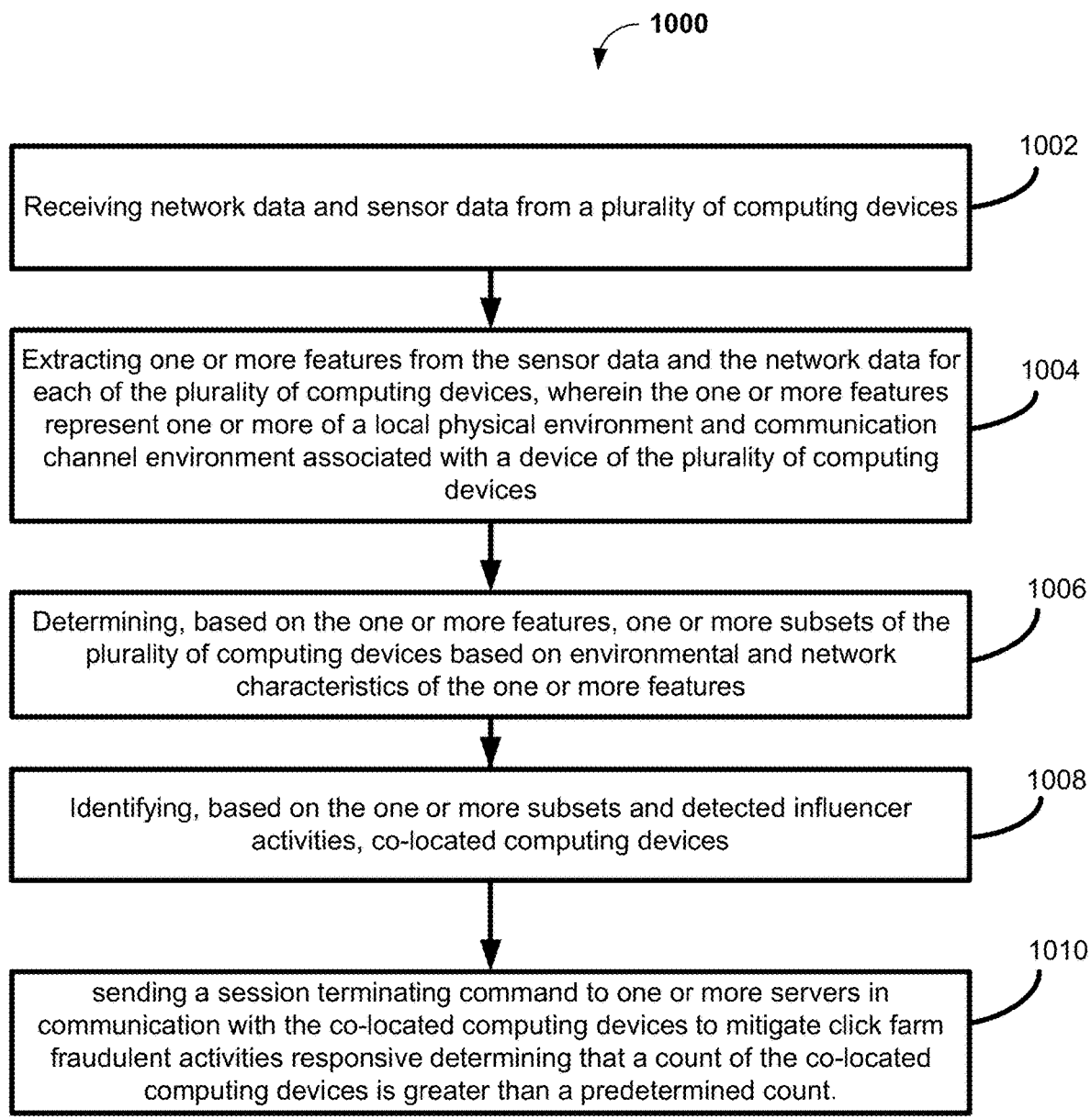
FIG. 10 is a flow diagram of another method, in accordance with certain implementations of the disclosed technology.

FIG. 10 is a flow diagram of a method 1000 for detecting and mitigating click farm fraud, in accordance with certain implementations of the disclosed technology. In block 1002, the method 1000 includes receiving network data and sensor data from a plurality of computing devices. In block 1004, the method 1000 includes extracting one or more features from the sensor data and the network data for each of the plurality of computing devices, wherein the one or more features represent one or more of a local physical environment and communication channel environment associated with a device of the plurality of computing devices. In block 1006, the method 1000 includes determining, based on the one or more features, one or more subsets of the plurality of computing devices based on environmental and network characteristics of the one or more features. In block 1008, the method 1000 includes identifying, based on the one or more subsets and detected influencer activities, co-located computing devices. In block 1010, the method 1000 includes sending a session terminating command to one or more servers in communication with the co-located computing devices to mitigate click farm fraudulent activities responsive determining that a count of the co-located computing devices is greater than a predetermined count.

In accordance with certain exemplary implementations of the disclosed technology, the sensor data can include one or more of location information; device orientation; device movement characteristics; ambient light conditions; and/or device battery charge. In certain implementations, the network data can include one or more of telecom network information; associated WiFi network information; and/or associated BLE devices.

In certain implementations, the influencer activities can include one or more of clicking on an advertisement, sharing a link, promoting content, and/or leaving a review.

In accordance with certain exemplary implementations of the disclosed technology, identifying the co-located computing devices may be further based on clustering the plurality of the computing devices into one or more subsets based on equivalent features of the one or more features.

In certain implementations, the clustering may be further based on substantially equivalent features of the one or more features over a predetermined time period.

Certain implementations of the disclosed technology may include alerting one or more of a WebServer, an Advertising Network, and a Publisher when a device is determined to be one of the co-located devices.

In certain implementations, the features extracted may further include one or more of nearby device WiFi data comprising Service Set Identifiers (SSIDs) and Received Signal Strength Indicator (RSSI) values of detected WiFi access points, a statistical distance between one or more of SSID values and RSSI values, cell tower identifiers, and a statistical distance between the cell tower identifiers.

In certain implementations, the sensor data may be time-series data. In certain implementations, the sensor data and/or the time-series of data may be low-pass filtered to detect unnaturally long durations exhibited by rack-mounted devices when stationary.

Certain implementations of the disclosed technology can include confirming a proximal arrangement of the one or more subsets of devices via actively probing. In certain implementations, the probing can include instructing a first device of the co-located devices of the one or more subsets to emit a signal and measuring an associated response from other devices of the co-located devices of the one or more subsets. In certain implementations, measuring the associated response from the other devices can include measuring using one or more of a microphone and a magnetometer sensor.

In certain implementations, the sensor data may further include higher-level aggregate estimates produced by an operating system of the device.

In certain implementations, the sensor data may be collected from a selected geographical region or a cohort of user data to identify the co-located devices of the one or more subsets.

Implementations of the subject matter and the functional operations described herein may be implemented in various systems, digital electronic circuitry, computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any of the disclosure or of what may be claimed, but rather as descriptions of features that may be specific to particular embodiments of particular inventions. Certain features that are described in the context of separate embodiments can also be implemented in combination in a single implementation. Conversely, various features that are described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A method for detecting and mitigating click farm fraud, comprising:
    receiving, at a backend server via a communication network, network data and sensor data from a plurality of remote computing devices;
    extracting, with a feature extraction/filtering module, one or more features from the sensor data and the network data for each of the plurality of computing devices, wherein the one or more features represent one or more of a remote physical environment and communication channel environment associated with a device of the plurality of remote computing devices;
    filtering, with the feature extraction/filtering module, one or more features from the sensor data to generate filtered sensor data;
    detecting, based on the filtered sensor data, stationary durations associated with one or more devices of the plurality of remote computing devices;
    determining, based on the one or more features and the stationary durations, one or more subsets of the plurality of remote computing devices;
    identifying, with a co-location determination module, and based on the one or more subsets and detected influencer activities, co-located computing devices; and
    responsive to determining that a count of the co-located computing devices is greater than a predetermined count, sending a session terminating command to one or more servers in communication with the co-located computing devices to mitigate click farm fraudulent activities.

2. The method of claim 1, wherein the sensor data comprises one or more of:
    location information;
    device orientation;
    device movement characteristics;
    ambient light conditions; and
    device battery charge;
and wherein network data comprises one or more of:
    telecom network information;
    associated WiFi network information; and
    associated BLE devices.

3. The method of claim 1, wherein the detected influencer activities comprise one or more of clicking on an advertisement, sharing a link, promoting content, and leaving a review.

4. The method of claim 1, wherein identifying the co-located computing devices is further based on clustering the plurality of the computing devices into one or more subsets based on equivalent features of the one or more features.

5. The method of claim 4, wherein the clustering is further based on substantially equivalent features of the one or more features over a predetermined time period.

6. The method of claim 1, further comprising alerting one or more of a WebServer, an Advertising Network, and a Publisher when a device is determined to be one of the co-located computing devices.

7. The method of claim 1, wherein the features extracted further include one or more of nearby device WiFi data comprising Service Set Identifiers (SSIDs) and Received Signal Strength Indicator (RSSI) values of detected WiFi access points, a statistical distance between one or more of SSID values and RSSI values, cell tower identifiers, and a statistical distance between the cell tower identifiers.

8. The method of claim 1, wherein the sensor data comprises time-series data, wherein the time-series data is low-pass filtered to detect unnaturally long durations exhibited by rack-mounted devices when stationary.

9. The method of claim 1, further comprising confirming a proximal arrangement of the one or more subsets of devices via actively probing, the probing comprising instructing a first device of the co-located computing devices of the one or more subsets to emit a signal and measuring an associated response from other devices of the co-located computing devices of the one or more subsets.

10. The method of claim 9, wherein measuring the associated response from the other devices comprises measuring using one or more of a microphone and a magnetometer sensor.

11. The method of claim 1, wherein the sensor data further comprises higher-level aggregate estimates produced by an operating system of at least one device of the plurality of computing devices.

12. The method of claim 1, wherein the sensor data is further collected from a selected geographical region or a cohort of user data to identify the co-located computing devices of the one or more subsets.

13. A system, comprising:
a processor; and
a memory having programming instructions stored thereon, which, when executed by the processor, cause the processor to:
receive, at a backend server via a communication network, network data and sensor data from a plurality of remote computing devices;
extract, with a feature extraction/filtering module, one or more features from the sensor data and the network data for each of the plurality of remote computing devices, wherein the one or more features represent one or more of a remote physical environment and communication channel environment associated with a device of the plurality of remote computing devices;
filter, with the feature extraction/filtering module, one or more features from the sensor data to generate filtered sensor data;
detect, based on the filtered sensor data, stationary durations associated with one or more devices of the plurality of remote computing devices;
determine, based on the one or more features and the stationary durations, one or more subsets of the plurality of remotecomputing devices;
identify, with a co-location determination module, and based on the one or more subsets and detected influencer activities, co-located computing devices; and
send a session terminating command to one or more servers in communication with the co-located computing devices to mitigate click farm fraudulent activities responsive to determining that a count of the co-located computing devices is greater than a predetermined count.

14. The system of claim 13, wherein the influencer activities comprise one or more of clicking on an advertisement, sharing a link, promoting content, and leaving a review.

15. The system of claim 13, wherein identifying the co-located computing devices is further based on clustering the plurality of the computing devices into one or more subsets based on equivalent features of the one or more features.

16. The system of claim 15, wherein the clustering is further based on substantially equivalent features of the one or more features over a predetermined time period.

17. The system of claim 13, further comprising alerting one or more of a WebServer, an Advertising Network, and a Publisher when a device is determined to be one of the co-located computing devices.

18. The system of claim 13, wherein the features extracted further include one or more of nearby device WiFi data comprising Service Set Identifiers (SSIDs) and Received Signal Strength Indicator (RSSI) values of detected WiFi access points, a statistical distance between one or more of SSID values and RSSI values, cell tower identifiers, and a statistical distance between the cell tower identifiers.

19. The system of claim 13, wherein the sensor data comprises time-series data, wherein the time-series data is low-pass filtered to detect unnaturally long durations exhibited by rack-mounted devices when stationary.

20. The system of claim 13, further comprising confirming a proximal arrangement of the one or more subsets of devices via actively probing, the probing comprising instructing a first device of the co-located computing devices of the one or more subsets to emit a signal and measuring an associated response from other devices of the co-located computing devices of the one or more subsets, wherein measuring the associated response from the other devices comprises measuring using one or more of a microphone and a magnetometer sensor.

* * * * *